(12) United States Patent
Sher et al.

(10) Patent No.: US 10,113,513 B2
(45) Date of Patent: *Oct. 30, 2018

(54) INTERNAL COMBUSTION ENGINES

(71) Applicant: Hydro-Ject, LLC, Wilmington, DE (US)

(72) Inventors: Eran Sher, Beer-Sheeva (IL); Ian Kurt Rosen, North Muskegon, MI (US)

(73) Assignee: HYDRO-JECT, LLC, Wilmington, DE (US)

( * ) Notice: Subject to any disclaimer, the term of this patent is extended or adjusted under 35 U.S.C. 154(b) by 2 days.

This patent is subject to a terminal disclaimer.

(21) Appl. No.: 15/022,944

(22) PCT Filed: Sep. 22, 2014

(86) PCT No.: PCT/GB2014/052879
§ 371 (c)(1),
(2) Date: Mar. 18, 2016

(87) PCT Pub. No.: WO2015/040427
PCT Pub. Date: Mar. 26, 2015

(65) Prior Publication Data
US 2016/0230653 A1    Aug. 11, 2016

(30) Foreign Application Priority Data

Sep. 20, 2013 (GB) .................................. 1316775.4
Nov. 26, 2013 (GB) .................................. 1320857.4

(51) Int. Cl.
*F02M 25/022* (2006.01)
*F02M 57/00* (2006.01)
(Continued)

(52) U.S. Cl.
CPC ............ *F02M 25/0227* (2013.01); *F01N 5/02* (2013.01); *F02B 47/02* (2013.01); *F02B 51/02* (2013.01);
(Continued)

(58) Field of Classification Search
CPC ........ F02B 47/02; F02B 51/02; F02M 25/022; F02M 25/0227; F02M 25/035;
(Continued)

(56) References Cited

U.S. PATENT DOCUMENTS 1,336,392 A    4/1920    Smith
2,872,778 A    2/1959    Dane
(Continued)

FOREIGN PATENT DOCUMENTS

DE        590890        1/1934
DE        2612961       10/1977
(Continued)

OTHER PUBLICATIONS

International Search Report and Written Opinion dated Feb. 18, 2015 from corresponding PCT patent application No. PCT/GB2014/052879.

*Primary Examiner* — John Kwon
*Assistant Examiner* — Johnny H Hoang
(74) *Attorney, Agent, or Firm* — Honigman Miller Schwartz and Cohn, LLP

(57) ABSTRACT

An internal combustion engine includes a combustion chamber. The chamber includes a body that is movable in the chamber to vary the chamber volume and contains a catalyst. First valving is operable to admit an intake gas into the chamber and second valving connected with an aqueous fluid supply system is operable to admit an aqueous fluid and a steam reforming fuel into the chamber. A controller is configured to cause the second valving to admit a aqueous
(Continued)

fluid and an amount of the steam reforming fuel into the chamber and when a predetermined condition exists in the chamber during compression of the intake gas to absorb heat generated by the compression of the intake gas in the presence of the catalyst to promote a steam reformation process to separate hydrogen from the steam reforming fuel or the aqueous fluid.

26 Claims, 8 Drawing Sheets

(51) Int. Cl.
| | |
|---|---|
| F02B 47/02 | (2006.01) |
| F02B 51/02 | (2006.01) |
| F02M 27/02 | (2006.01) |
| F01N 5/02 | (2006.01) |
| F02M 25/038 | (2006.01) |
| F02P 19/02 | (2006.01) |
| F02M 25/035 | (2006.01) |
| F02B 13/10 | (2006.01) |
| F02D 19/12 | (2006.01) |

(52) U.S. Cl.
CPC ........ *F02M 25/022* (2013.01); *F02M 25/035* (2013.01); *F02M 25/038* (2013.01); *F02M 27/02* (2013.01); *F02M 57/00* (2013.01); *F02P 19/02* (2013.01); *F02B 13/10* (2013.01); *F02D 19/12* (2013.01); *Y02T 10/121* (2013.01); *Y02T 10/126* (2013.01); *Y02T 10/16* (2013.01)

(58) Field of Classification Search
CPC ...... F02M 25/038; F02M 27/02; F02M 57/00; F01N 5/02; F02P 19/02
USPC .......... 123/1 A, 1 R, 2, 3, 19, 295, 299–301, 123/DIG. 12, 435
See application file for complete search history.

(56) References Cited

U.S. PATENT DOCUMENTS

| | | | |
|---|---|---|---|
| 2,979,043 A | 4/1961 | Meurer et al. | |
| 3,361,353 A | 1/1968 | Millman | |
| 3,608,660 A | 9/1971 | Smith et al. | |
| 3,815,555 A | 6/1974 | Tubeuf | |
| 3,946,711 A | 3/1976 | Wigal | |
| 3,969,899 A | 7/1976 | Nakazawa et al. | |
| 3,980,064 A | 9/1976 | Ariga et al. | |
| 4,148,701 A | 4/1979 | Leach | |
| 4,185,593 A | 1/1980 | McClure | |
| 4,380,970 A | 4/1983 | Davis | |
| 4,508,064 A | 4/1985 | Watanabe | |
| 4,530,317 A | 7/1985 | Schutten | |
| 4,777,801 A | 10/1988 | Porter | |
| 5,085,176 A | 2/1992 | Brinkley, III | |
| 5,088,452 A | 2/1992 | Iwaki et al. | |
| 5,113,806 A | 5/1992 | Rodart | |
| 5,127,369 A | 7/1992 | Goldshtik | |
| 5,156,114 A | 10/1992 | Gunnerman | |
| 5,183,011 A | 2/1993 | Fujii et al. | |
| 5,237,964 A | 8/1993 | Tomoiu | |
| 5,305,714 A | 4/1994 | Sekiguchi et al. | |
| 5,647,734 A | 7/1997 | Milleron | |
| 5,713,202 A | 2/1998 | Johnson | |
| 6,112,522 A | 9/2000 | Wright | |
| 6,659,049 B2 | 12/2003 | Zagaja et al. | |
| 7,191,738 B2 | 3/2007 | Shkolnik | |
| 8,985,065 B2 | 3/2015 | Buchanan | |
| 2002/0168306 A1 | 11/2002 | Gittleman | |
| 2003/0056510 A1 | 3/2003 | Ovshinsky et al. | |
| 2004/0003781 A1 | 1/2004 | Akihiro et al. | |
| 2005/0166869 A1 | 8/2005 | Shkolnik | |
| 2006/0204799 A1 | 9/2006 | Ishikawa et al. | |
| 2008/0202449 A1 | 8/2008 | Shimada et al. | |
| 2008/0245318 A1 | 10/2008 | Kuroki et al. | |
| 2008/0271706 A1* | 11/2008 | Sharpe | F02B 43/10 123/445 |
| 2009/0088952 A1* | 4/2009 | Cheiky | F02B 31/00 701/103 |
| 2009/0180939 A1 | 7/2009 | Hagen et al. | |
| 2010/0183993 A1 | 7/2010 | McAlister | |
| 2010/0307431 A1 | 12/2010 | Buchanan | |
| 2011/0005473 A1 | 1/2011 | Ishikawa et al. | |
| 2013/0311062 A1 | 11/2013 | Skipp et al. | |
| 2015/0040546 A1 | 2/2015 | Buchanan | |
| 2016/0230705 A1 | 8/2016 | Sher | |

FOREIGN PATENT DOCUMENTS

| | | |
|---|---|---|
| DE | 19646754 | 5/1998 |
| DE | 202004004502 | 7/2004 |
| DE | 102005039296 | 2/2007 |
| DE | 102008053774 | 4/2010 |
| FR | 1011313 | 6/1952 |
| FR | 2585769 | 2/1987 |
| GB | 16711 | 8/1905 |
| GB | 20934 | 5/1911 |
| GB | 207811 | 7/1924 |
| GB | 207811 | 4/1961 |
| GB | 1191130 | 5/1970 |
| GB | 1511863 | 5/1978 |
| GB | 2394511 | 4/2004 |
| JP | 2008014139 | 1/2008 |
| NL | 1018858 | 3/2003 |
| RU | 2042844 | 8/1995 |
| WO | WO2002020959 | 3/2002 |
| WO | WO2002055851 | 7/2002 |
| WO | WO2009101420 | 8/2009 |
| WO | WO2011028224 | 3/2011 |

* cited by examiner

INTERNAL COMBUSTION ENGINES

CROSS REFERENCE TO RELATED APPLICATIONS

The present application is a 371 national phase filing of PCT Application No. PCT/GB2014/052879, filed Sep. 22, 2014, which claims the filing benefits of GB patent application No. 1320857.4, filed Nov. 26, 2013, and GB patent application No. 1316775.4, filed Sep. 20, 2013.

FIELD OF THE INVENTION

The invention relates to internal combustion engines and particularly, but not exclusively, to internal combustion engines for powering automotive vehicles.

BACKGROUND TO THE INVENTION

The reciprocating piston spark ignition engine is one known form of internal combustion engine used to power automotive vehicles. Reciprocating piston spark ignition engines comprise a number of pistons arranged to reciprocate in respective cylinders and each connected to a crankshaft. Each of the cylinders is provided with inlet valving for controlling the inflow of air and fuel, exhaust valving for controlling the exhaust of the products of combustion and a spark plug for igniting the air fuel mixture. Where the supply of fuel to the engine is controlled by a carburetor, the air and fuel are mixed in an intake manifold upstream of the cylinders and the inlet valving comprises an intake valve that controls the intake of the fuel-air mixture into the cylinder. If the fuel supply to the cylinders is by fuel injection, the inlet valving comprises two valves. One of the valves is a fuel injector and the other is an air intake valve. The fuel injector may be arranged to inject fuel directly into the cylinder or may inject it into an air intake duct just upstream of the air intake valve.

Typically, reciprocating spark ignition engines operate a four-stroke cycle. Each movement of a piston up or down its cylinder comprises one stroke of the four-stroke cycle. The four-stroke cycle consists of:

an induction stroke during which the inlet valving opens and air and fuel are taken into the engine as the piston moves towards the crankshaft;

a compression stroke during which the inlet and exhaust valving are closed and the air fuel mixture is compressed while the piston moves away from the crankshaft;

a power, or working, stroke during which the compressed mixture is ignited and the rapid expansion caused by combustion of the mixture forces the piston back towards the crankshaft; and an exhaust stroke during which the exhaust valving is open and the exhaust gases are forced out of the cylinder as the piston moves away from the crankshaft again.

Some reciprocating piston spark ignition engines operate a two-stroke cycle, which is a variant of the four-stroke cycle. Such engines are usually of smaller capacity than four-stroke engines and in terms of passenger vehicles tend to be used for two-wheeled vehicles. Two stroke engines use ports located along the side of the cylinder instead of valves. As the piston moves up and down the cylinder, the ports are covered and uncovered depending on where the piston is in the cylinder. In essence, in a two-stroke engine the induction and compression processes take place during the first stroke and the combustion and exhaust processes take place during the second stroke.

The reciprocating piston compression ignition internal combustion engine is another form of engine commonly used to power automotive vehicles. Reciprocating piston compression ignition engines use a fuel having a higher auto-ignition temperature than the fuels used by spark ignition engines and operate a modified version of the four-stroke cycle described above. Specifically, during the induction stroke air is drawn into the cylinder and that air is compressed to a high pressure and temperature during the compression stroke. Fuel is then injected directly into the cylinder (or into a mixing chamber that leads into the cylinder) and combustion takes place as the fuel mixes with the high temperature compressed air in the cylinder. Historically, reciprocating piston compression ignition engines were considered noisy and slow and in the automotive field were used mainly for trucks and other commercial vehicles such as buses. However in more recent times, high performance reciprocating piston compression ignition engines have been developed and now reciprocating piston compression ignition engines are commonly used in small passenger vehicles such as saloon cars (sedans).

The Wankel engine is another form of spark ignition engine that has been used to power automotive vehicles. The Wankel engine employs a four 'stroke' cycle similar to the four-stroke cycle employed by the reciprocating piston spark ignition internal combustion engine. However, instead of reciprocating pistons, the Wankel engine has a roughly triangular rotor that is mounted on an eccentric shaft for rotation in an approximately oval (epitrochoid-shaped) chamber. The 'four strokes' take place in the spaces between the rotor and the chamber wall.

A common feature of these known internal combustion engines is that the fuel air mixture is input to a chamber in which it is combusted so that the rapid expansion of the mixture caused by the combustion acts directly on a body (piston or rotor) that is connected to an output shaft so as to cause rotation of the shaft; the output of the engine being the rotation of the shaft.

An engine in which a body of liquid acts as the reciprocating piston has also been proposed.

SUMMARY OF THE INVENTION

The invention provides a method of operating an internal combustion engine as specified in claim 1.

The invention also includes an internal combustion engine as specified in claim 13.

The invention also includes an internal combustion engine as specified in claim 14.

BRIEF DESCRIPTION OF THE DRAWINGS

In the disclosure that follows, reference will be made to the drawings in which.

DETAILED DESCRIPTION

Figure 1:
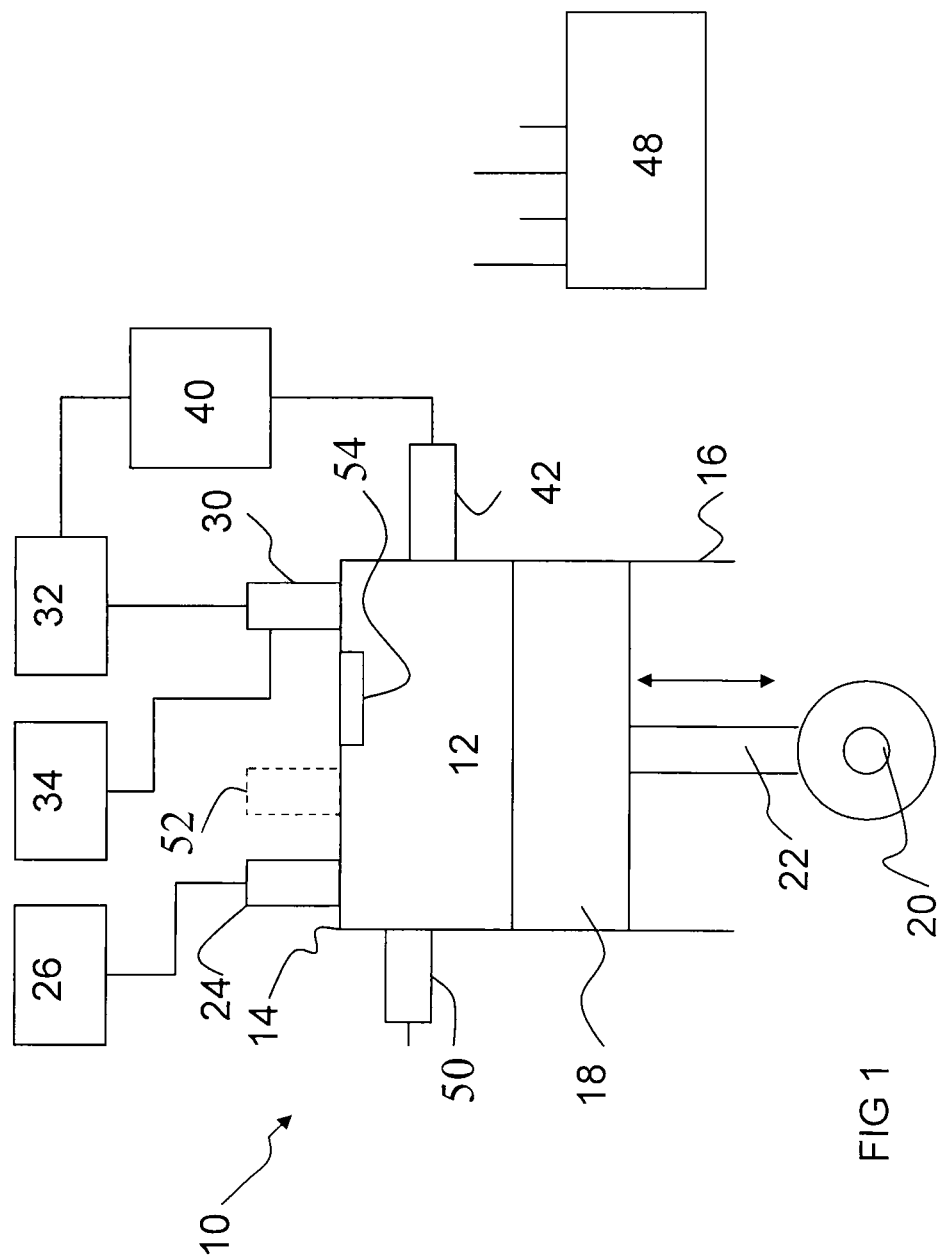
FIG. 1 is a schematic representation of an internal combustion engine.

Referring to FIG. 1, an internal combustion engine 10 comprises a variable volume combustion chamber 12 defined by a housing, or cylinder, having walls 14, 16, and a body that is movable in the chamber. In the illustrated example, the body is a reciprocating piston 18 that is connected with a crankshaft 20 by a connecting rod 22.

The internal combustion engine 10 comprises first valving 24 operable to admit an intake gas comprising an aspirant into the combustion chamber 12. In the illustrated example, the intake gas is air received from an air supply system 26 connected with the first valving 24. The air supply system 26 may comprise a manifold configured to receive ambient air and conduct the air to the first valving 24. The first valving 24 may comprise one or a plurality of valves connected with the air supply system 26. The air supply system 26 may comprise suitable filters to clean the air.

Figure 2:
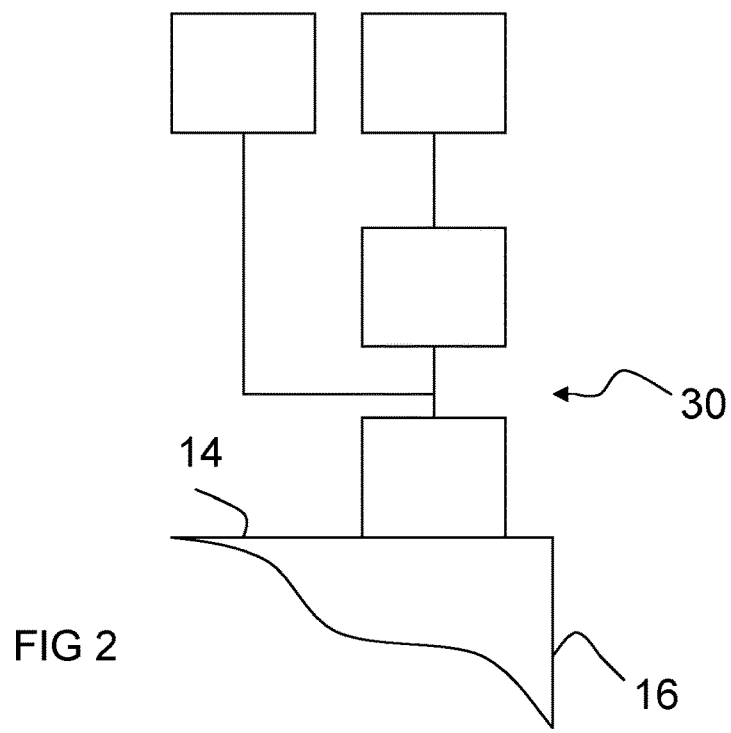
FIG. 2 is a schematic representation of an example of valving for the internal combustion engine of FIG. 1.
Figure 3:
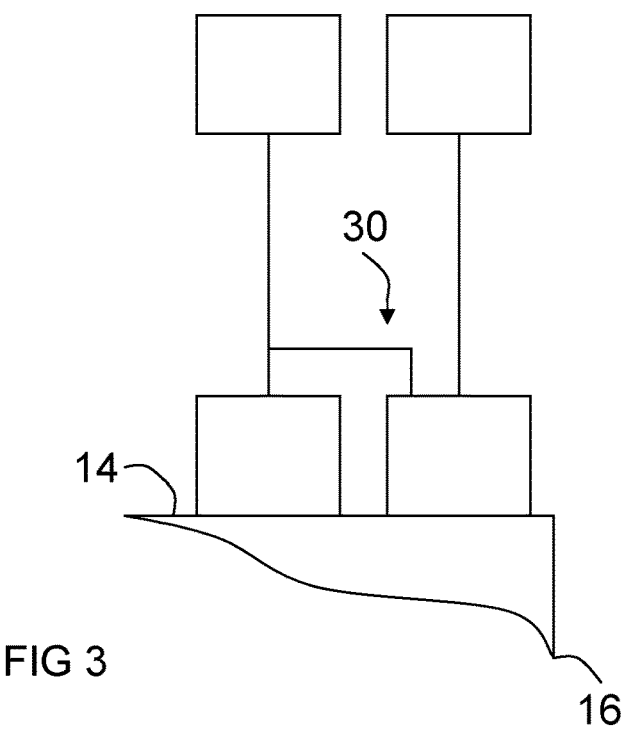
FIG. 3 is a schematic representation of another example of valving for the internal combustion engine of FIG. 1.

The internal combustion engine 10 comprises second valving 30 that is connected with a steam supply system 32 and a reservoir 34 containing a fuel for the internal combustion engine. The second valving 30 is operable to admit steam from the steam supply system 32 and fuel from the reservoir 34 into the combustion chamber 12 as a mixture. As shown in FIG. 2, the second valving 30 may comprise one or a plurality of first valves 36 that open into the combustion chamber 12 and one or more second valves 38 disposed between the steam supply system 32 and the first valve(s) 36 so as to isolate the first valves from the steam supply system and permit it/them to admit fuel alone into the combustion chamber. In another example shown in FIG. 3, the second valving 30 comprises one or a plurality of first valves 36 that open into the combustion chamber 12 and are connected with the steam supply system 32 and the reservoir 34 to admit the fuel-steam mixture into the combustion chamber and one or plurality of second valves 38 that open into the combustion chamber 12 and are separately connected to the reservoir 34 and isolated from the steam supply system to allow it/them to admit fuel into the combustion chamber independently of the first valve(s).

The internal combustion engine 10 is provided with an exhaust system 40 and exhaust valving 42 comprising at least one exhaust valve that is operable to release exhaust gases from the combustion chamber 12 into the exhaust system. In the illustrated example, the exhaust system 40 is cooperable with the steam supply system 32 to extract heat from exhaust gases flowing in the exhaust system to provide at least a part of the heat used to produce the steam. This may, for example, be achieved by having piping through which the exhaust gases flow winding around a pipe or a vessel in which the steam is produced or flowing the exhaust gases through a vessel containing one or more steam pipes.

The internal combustion engine 10 comprises a controller 48 to control the operation of the first valving 24, second valving 30 and exhaust valving 42. In the illustrated example, the first valving 24, second valving 30 and exhaust valving 42 comprise electrically actuated valves, for example solenoid valves, that are opened and closed in response to electrical command signals issued by the controller 48. In other examples, at least one of the first valving 24, second valving 30 and exhaust valving 42 may include one or more valves that are hydraulically or pneumatically actuated in response to electrical command signals issued by the controller 48 to a source of hydraulic or pneumatic actuating fluid.

The internal combustion engine 10 further comprises one or more sensors 50 connected with the controller 48 to provide the controller with signals indicative of the pressure/temperature in the combustion chamber 12. The sensor(s) 50 may be a pressure sensor(s) or a temperature sensor(s). The sensor(s) 50 may be any suitable type of sensor capable of operating at the relatively high temperatures that will be encountered in use of the internal combustion engine 10. For the purposes of controlling operation of the internal combustion engine 10, at least during some phases of its operation, the temperature sensor(s) need to be highly responsive to temperature changes taking place within the combustion chamber 12. The temperature sensor(s) may be an infrared temperature sensor(s) that senses the temperature in the combustion chamber through a translucent window (not shown). Alternatively, for example, a high temperature embedded photodiode such as is disclosed in U.S. Pat. No. 5,659,133 (the content of which is incorporated herein by reference) could be used.

The internal combustion engine 10 may be provided with a combustion initiator 52 to assist in initiating combustion events in the combustion chamber 12. The combustion initiator 52 may be an electrical combustion initiator such as a glow plug, hot wire, spark plug or the like.

A catalyst 54 is mounted in the combustion chamber 12 by any convenient method. The catalyst 54 may, for example, be mounted in a mounting comprising suitable recessing provided in the wall 14 so that it does not affect the volume of the combustion chamber 12. The catalyst 54 may alternatively, or additionally, be mounted on the crown of the piston 18, preferably in a mounting comprising suitable recessing as shown in FIG. 1. Mounting the catalyst 54 on the piston is not currently preferred as it increases the inertia of the piston. In another example, the catalyst may instead, or additionally, be mounted on the first valve(s) 36. Examples of catalyst mounting on an injector valve are described below with reference to FIGS. 8 and 9. In another example, the catalyst may instead, or additionally, be provided on a combustion initiator 52. Examples of catalyst mounting on a combustion initiator are described below with reference to FIG. 10.

In FIG. 1, the connections between the controller 48 and the valving 24, 30, 42 and the sensor(s) 50 are not shown. This is simply for the sake of clarity of illustration and the skilled person will have no difficulty in envisaging suitable ways and means for making the connections.

In FIG. 1, the internal combustion engine 10 is shown comprising just one combustion chamber 12. While this may be appropriate for some applications, typically the internal combustion engine 10 will comprise a plurality of combustion chambers 12, each having a piston 18 connected to the crankshaft 20. In a multiple chamber, or cylinder, engine, the chambers may be arranged in any suitable known configuration such as in-line, flat or a V.

Figure 4:
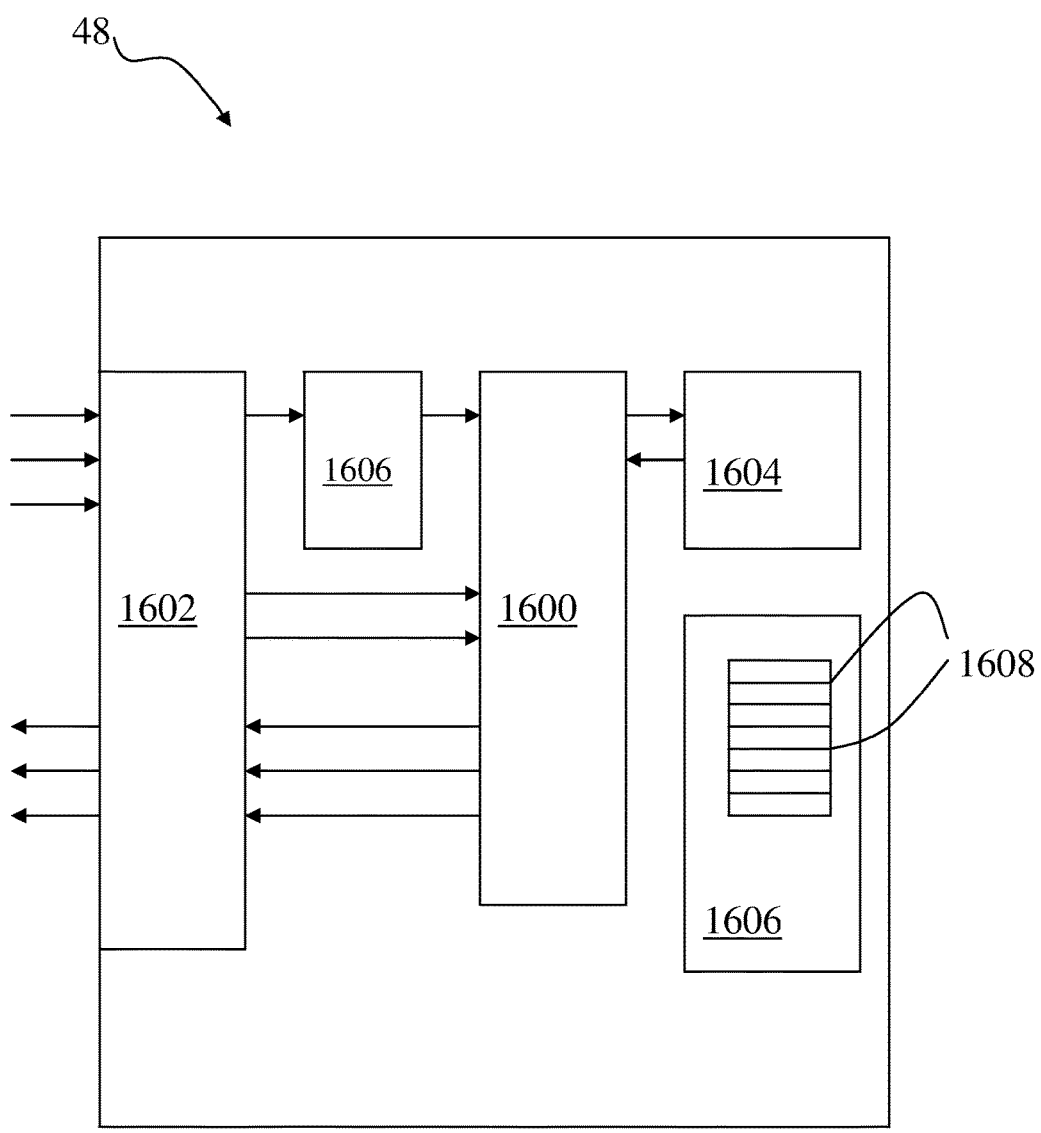
FIG. 4 is a schematic representation of an example of a controller for the internal combustion engine.

Referring to FIG. 4, a suitable controller 48 for the internal combustion engine 10 may comprise one or more a processors 1600 and signal conditioning components 1602 for, for example, amplifying signals and converting analogue signals to digital and digital signals to analogue to permit the controller to receive and use signals from the sensor(s) 54 and output usable signals to the valving 24, 30, 42 and other components of the internal combustion engine 10 that may be controlled by the controller. The controller 48 may additionally comprise one or more random access memories (RAM) 1604 for storing data generated during operation of the internal combustion engine and circuitry 1606 for use in sampling incoming signals from one or more sensors to provide a usable input for the processor. The control unit 728 may additionally comprise one or more data storage components in the form of permanent memory 1606, which may be a read only memory (ROM), in which one or more control software portions 1608 are permanently stored. Of course, for some applications, no permanent memory is required. For example, the controller may be connected with a master computer in which the control algorithms are stored and which uploads them to a RAM in the controller at start up of the controller. Another alternative would be for the controller to be slaved to a master controller or computer. Yet another alternative would be for the controller to comprise one or more hard wired control circuits.

The internal combustion engine 10 may operate on a modified diesel cycle. Operation of the internal combustion engine 10 using a modified diesel cycle will now be described with reference to FIGS. 5 and 6.

Figure 5:
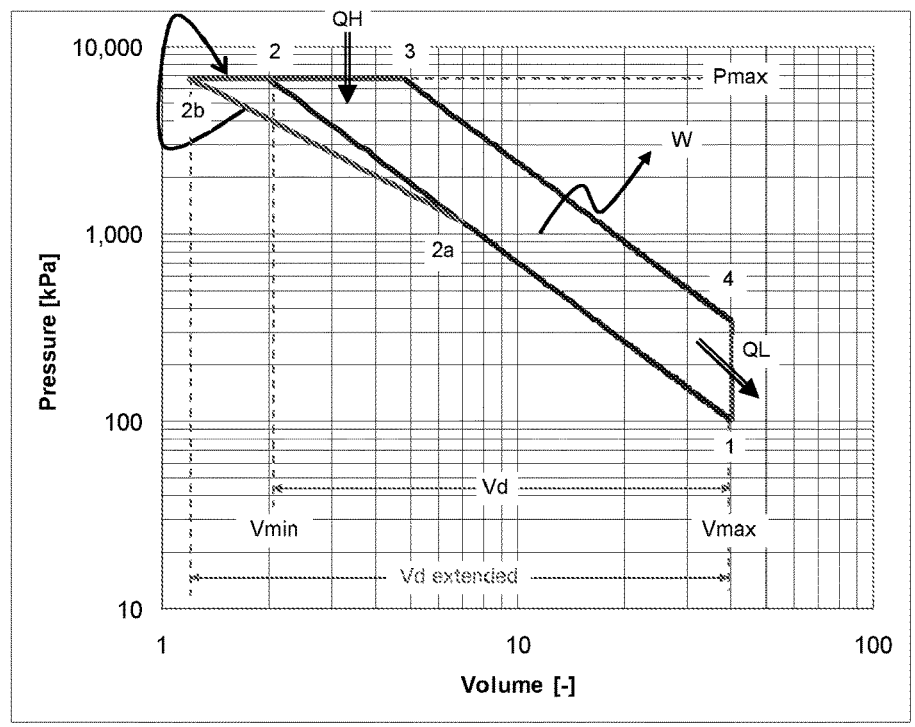
FIG. 5 is a pressure-volume diagram illustrating a cycle of the internal combustion engine of FIG. 1.
Figure 6:
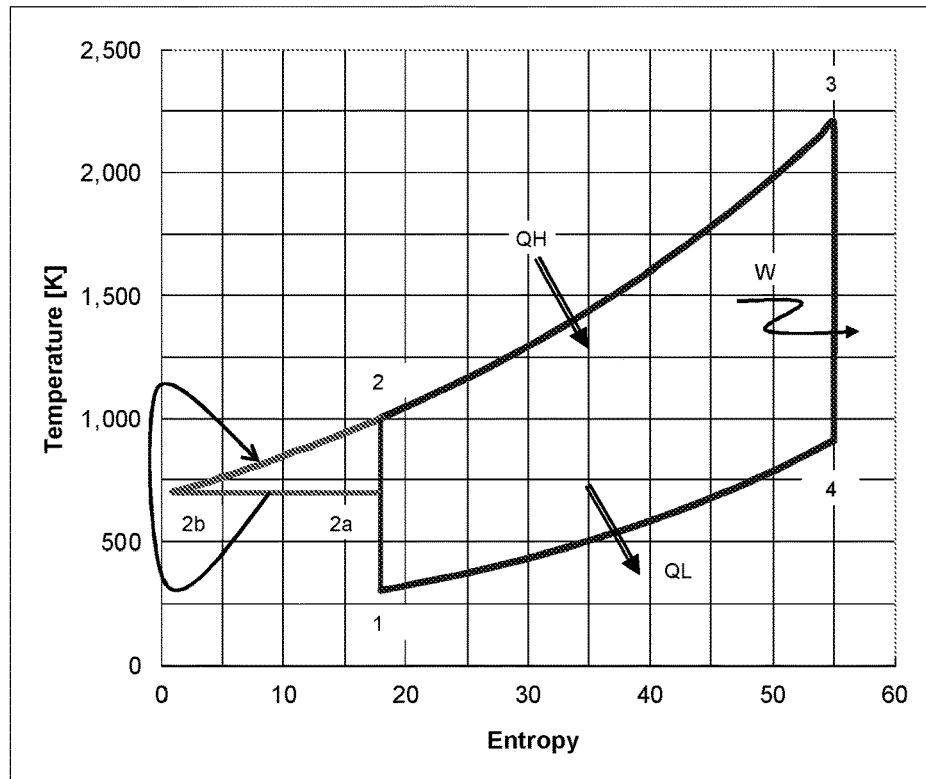
FIG. 6 is a temperature-entropy diagram illustrating the cycle of FIG. 4.

Referring to FIGS. 5 and 6, point 1 indicates the start of an operating cycle of the internal combustion engine 10. At point 1, the piston 18 is at one end of its reciprocating stroke (the lowermost position as viewed in FIG. 1). This is commonly referred to as bottom dead centre (BDC) position, even in cases in which the engine cylinders are orientated horizontally such as in a flat four. At this stage, exhaust gases from a previous cycle have been substantially removed from the combustion chamber 12 and a fresh charge of intake gas at ambient pressure and temperature has been admitted by operation of the exhaust valving 42 and first valving 24 respectively. The first valving 24 and exhaust valving 40 are closed. The intake gas is at a first pressure $P_1$ and first temperature $T_1$. The piston 18 then moves from BDC towards the wall 14. As the piston moves towards the wall 14, it reduces the volume of the combustion chamber 12 and in so doing, it compresses the intake gas. The compression of the intake gas raises its pressure and temperature from $P_1$, $T_1$. The internal combustion engine 10 is configured so that when the piston 18 reaches the opposite end of its stroke at which it is closest to the wall 14, commonly referred to as the top dead centre (TDC) position, the volume of the combustion chamber 12 is reduced sufficiently for the intake gas to have been compressed to a predetermined pressure $P_2$. The TDC position is indicated at position 2b.

As shown in FIGS. 5 and 6, as the pressure of the intake gas rises from the pressure $P_1$ at point 1, its temperature initially rises correspondingly from temperature $T_1$, which may typically be around 293° K. When a predetermined pressure/temperature $P_{2a}/T_{2a}$ indicated at point 2a is achieved, the controller 48 issues signals to cause the second valving 30 to open and admit a metered mixture of fuel and steam into the combustion chamber 12. The admission of the fuel and steam mixture into the hot intake gases in the presence of the catalyst promotes a steam reformation process by which hydrogen is separated from the fuel or the steam. The hydrogen is combusted in the combustion chamber 12 at a later stage in the cycle. The steam and fuel absorb heat from the compressed intake gases due to the steam reforming process thereby cooling the intake gases. In the illustrated example, the fuel and steam mixture is admitted at a metered rate that cools the intake gases sufficiently to maintain a substantially constant temperature as the compression of the intake gases continues from point 2a to point 2b so that, as shown in FIG. 6, the temperatures $T_{2a}$ and $T_{2b}$ are at least substantially equal. Point 2b indicates the point at which the piston has reached TDC and is ready for the expansion stroke in which it returns to BDC. At point 2b, the controller 40 issues signals to cause the second valving 30 to cease admitting steam to the combustion chamber 12 and to admit a metered charge of fuel into the combustion chamber for the combustion process.

At point 2b, the pressure $P_{2b}$ and temperature $T_{2b}$ in the combustion chamber 12 are such that the hydrogen and fuel should spontaneously ignite. Where a glow plug, hot wire or the like 52 is provided to assist in initiating the combustion of the hydrogen and fuel, the controller 48 is configured to issue a signal to an electrical power source (not shown) to cause the glow plug, hot wire or the like to be energised at the same time as, or shortly after, the issue of the signal to cause the second valving 30 to cease admitting steam and to admit the metered charge of fuel into the combustion chamber 12. The combustion of the fuel and hydrogen in the combustion chamber 12 causes the piston 18 to be driven from the TDC position back towards the BDC position. The movement of the piston is transmitted to the crankshaft 20 by the connecting rod 22 to turn the crankshaft and provide work output W from the internal combustion engine 10. In the illustrated example, the fuel is admitted into the combustion chamber 12 at a metered rate selected so that the combustion of the fuel and hydrogen takes place under substantially constant pressure conditions. The metered fuel is admitted during the period between points 2b and 3 in FIGS. 5 and 6.

At point 3, which may be determined as a predetermined elapse of time from point 2b or when a predetermined pressure/temperature is detected by the sensor(s) 54, the controller 48 issues a signal causing the second valving 30 to cease admitting fuel to the combustion chamber 12. The combustion gases continue expanding as the piston 18 moves towards the BDC position and the pressure and temperature in the combustion chamber progressively fall towards point 4, which represents the BDC position. At point 4, which may be indicated by a pressure/temperature $P_4/T_4$ detected by the sensor(s) 54, the controller 48 issues a signal to cause the exhaust valving 42 to open to release the combustion gases (exhaust gases) into the exhaust system 40. As the exhaust gases are released from the combustion chamber 12, the pressure in the chamber rapidly falls towards ambient pressure. At this stage, the first valving 24 is caused to open to admit a fresh charge of intake gases and the operational cycle is back at point 1 and ready for the next cycle. The exhaust valving 42 may remain open, at least initially, following the open of the first valving 24 to allow chamber scavenging by the incoming intake gas.

The above-described cycle harvests heat generated during the compression stroke to produce additional fuel in the form of hydrogen produced by steam reformation. This additional fuel increases the cycle performance. The overall amount of fuel that is combusted between points 2b and 3 in FIGS. 5 and 6 is the fuel injected during the compression stroke between points 2a and 2b, less the fuel consumed in the steam reformation process, plus the hydrogen fuel generated by the steam reformation process and the fuel admitted into the combustion chamber between points 2b and 3. In total that combination should have a higher calorific value than the fuel admitted between points 2a and 3 as the hydrogen generating reactions are endothermic in total. If the same amount of supplied fuel were supplied to a standard diesel cycle, the fuel would be admitted to the combustion chamber between points 2 and 3 in FIGS. 5 and 6. It can be seen that the indicated work (area of the P-V diagram shown in FIG. 5) for the modified diesel cycle (points 1 to 2a to 2b to 3 to 4 to 1) is larger for the same amount of admitted fuel as in a comparable standard diesel cycle (points 1 to 2 to 3 to 4 to 1), hence the superior efficiency of the modified diesel cycle.

The efficiency improvement provided by the modified diesel cycle illustrated by FIGS. 5 and 6 can be evaluated by considering the work and heat energies for each stage as follows:

Isentropic compression (point 1 to point 2a):

$$_1W_{2a} = mc_v(T_{2a}-T_1) \quad _1Q_{2a} = 0 \tag{3}$$

Isothermic compression (point 2a to point 2b):

$$_{2a}W_{2b} = mRT_{2a,2b}\ln\left(\frac{V_{2b}}{V_{2a}}\right)$$

$$_{2a}Q_{2b} = {}_{2a}W_{2b}\text{(the heat that is absorbed by steam reforming)} \tag{4}$$

Isobaric combustion (point 2b to point 3):

$$_{2b}W_3 = P_{2b,3}(V_3-V_{2b}) \quad _{2b}Q_3 = mc_p(T_3-T_{2b}) \tag{5}$$

Isentropic expansion (point 3 to point 4):

$$_3W_4 = mc_v(T_4-T_3) \quad _3Q_4 = 0 \tag{6}$$

Scavenging (4→1):

$$_4W_1 = 0 \quad _4Q_1 = mc_v(T_1-T_4) \tag{7}$$

The efficiency is then evaluated as the net work over spent heat:

$$\eta = \frac{{}_1W_{2a} + {}_{2a}W_{2b} + {}_{2b}W_3 + {}_3W_4 + {}_4W_1}{{}_{2a}Q_{2b} + {}_{2b}Q_3} \tag{8}$$

(note that $_{2a}Q_{2b}$ is negative).

A comparable standard Diesel cycle (of the same maximum pressure and volume) would have the efficiency:

$$\eta = \frac{{}_2W_3 + {}_3W_4 + {}_4W_1}{{}_2Q_3} \tag{9}$$

For a compression ratio of 1:25, ambient STP conditions, a point 2a (catalytic) temperature of 700K, methane as the fuel and stoichiometric combustion, a theoretical cycle efficiency improvement from 66% to 75% is obtained. It is to be understood that methane is given purely as an example of a suitable fuel and that in principle any suitable hydrocarbon may be used with butane, ethanol, methanol and propane (in no particular order) all being considered good fuels for steam reforming. Conventional internal combustion engine fuels such as diesel and petrol (gasoline) may also be used.

The temperature $T_{2a}$ at point 2a at which fuel is admitted into the combustion chamber 12 during the compression stroke is selected as the minimum temperature that will suffice for a significant amount of steam reformation to occur. It is desirable to make this temperature $T_{2a}$ a minimum as this allows for more heat from the compression stroke to be absorbed, which allows a higher compression ratio to be obtained for the same maximum pressure $P_{2b}$. The temperature $T_{2a}$ selected can be found empirically and may represent a compromise between obtaining a reasonable amount of steam reformation and absorbing additional heat. Another factor to be taken into account in determining the temperature $T_{2a}$ is the rate of the catalysed reaction, which increases with temperature and may place a limit on how low the temperature $T_{2a}$ may be if a significant amount of steam reformation is to occur. In general it can be expected that larger engines operating at lower speeds will be able to accommodate a wider selection of catalysts or lower point 2a temperatures.

Another potential advantage of the modified diesel cycle illustrated by FIGS. 5 and 6 is that obtaining higher efficiencies without elevating the maximum operating temperature of the internal combustion engine 10 produces, in effect, a reduction in pollution generated for the power output. In addition, because hydrogen combustion is involved, it is to be expected that the emission levels of carbon monoxide (CO) and hydrocarbons (HC) will be very low compared to a conventional diesel engine.

Yet another advantage of the modified diesel cycle is that the heat absorption by the steam reforming process may result in a lower temperature $T_{2b}$ in the combustion chamber at the end of the compression stroke than the temperature $T_2$ in a comparable conventional diesel engine (compare points 2b and 2 in FIG. 6). Since nitrous oxide (NOx) production depends exponentially on temperature, the NOx emission level of an internal combustion engine 10 operating the modified diesel cycle should be very low, at least compared with an engine running a conventional diesel cycle.

Figure 7:
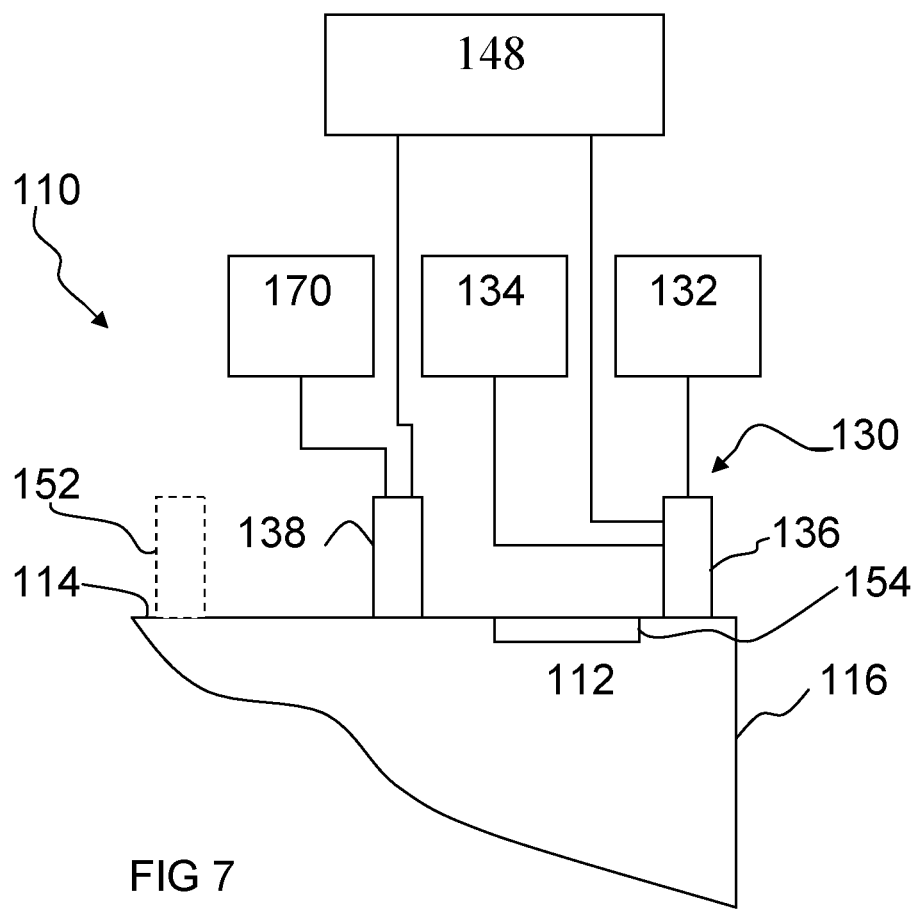
FIG. 7 is a schematic representation of a modification of a part of the internal combustion engine of FIG. 1.

FIG. 7 shows a modified form of the internal combustion engine of FIGS. 1 to 4. In FIG. 7 components that are the same as, or similar to, components shown in FIG. 1 are indicated by the same reference numerals incremented by 100 and may not be described again. The difference between the internal combustion engine 110 and the internal combustion 10 is that it has a second reservoir 170. The first reservoir 134 is used to hold a steam reforming fuel for the steam reforming process that is admitted into the combustion chamber 112 between points 2a and 2b (FIGS. 5 and 6) of the compression stroke for consumption in the steam reforming process. The second reservoir 170 holds a combustible fuel that is admitted into the combustion chamber 112 during the combustion phase between points 2b and 3 (FIGS. 5 and 6). In this example, the second valving 130 comprises at least one first valve 136 connected with the steam supply system 132 and first reservoir 134 to admit the fuel-steam mixture into the combustion chamber and at least one second valve 138 connected with the second reservoir 170 to admit the fuel into the combustion chamber. The first valve(s) 136 may comprise an injector valve fitted with a catalyst, for example, as described below with reference to FIGS. 8 and 9. The internal combustion engine 110 may be provided with a combustion initiator that carries a catalyst for the steam reformation process, for example, a glow plug as described below with reference to FIG. 10.

The configuration illustrated by the example shown in FIG. 7 allows the possibility of supplying one fuel for the steam reforming process and a different fuel for the combustion process so that a fuel that might be expected to give better hydrogen yields for the steam reforming process can be selected where it is desirable to use a different fuel for the combustion process, for example for efficiency or availability reasons. Thus, for example, in some examples a fuel with limited availability such as a relatively cheap bio-waste fuel may be used as the steam reforming fuel for the steam reforming process and a more readily available fuel, for example diesel or petrol (gasoline) may be used as the combustible fuel for the combustion process. Similarly, a 'light' fuel such as methanol or methane may be used as the steam reforming fuel for the steam reforming process since it may produce greater efficiencies, while a more readily available heavier fossil fuel such as diesel or petrol may be used as the combustible fuel for the combustion process.

Figure 8:
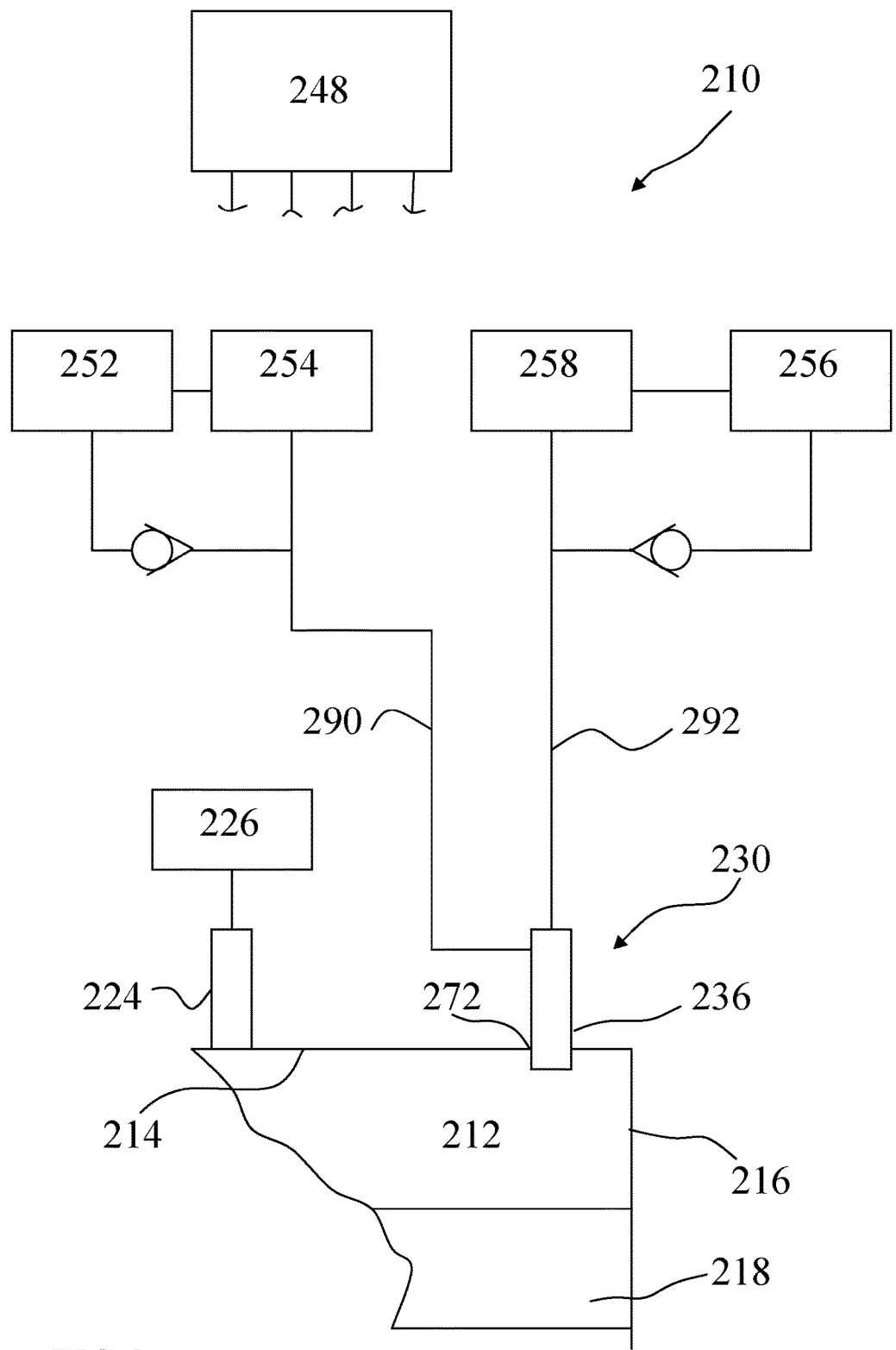
FIG. 8 is a schematic representation of another internal combustion engine.
Figure 9:
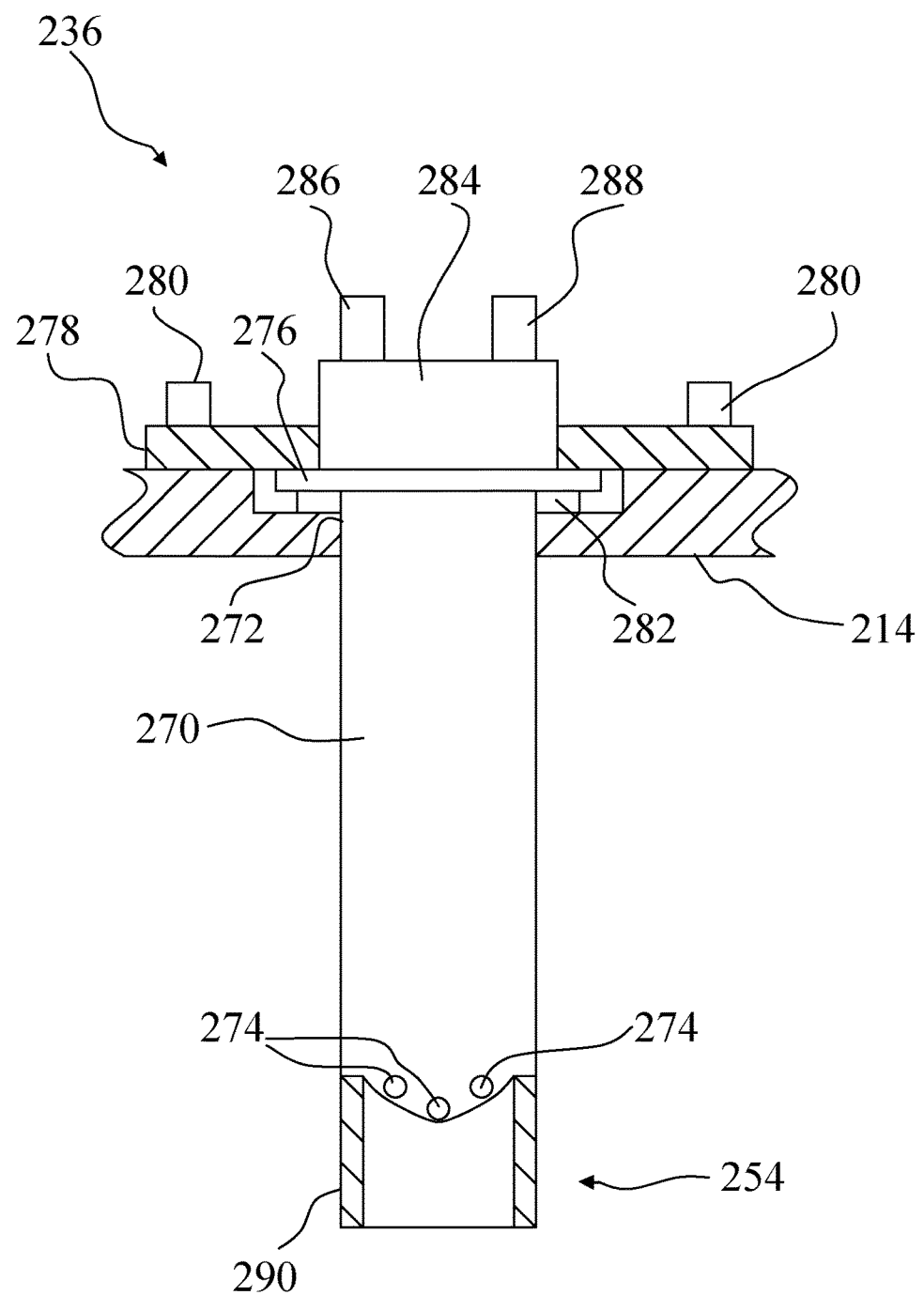
FIG. 9 is a schematic representation of an injector valve of the internal combustion engine of FIG. 8.

FIGS. 8 and 9 show features of another internal combustion engine 210. Parts of the internal combustion engine 210 similar to or the same as parts of the internal combustion engine 10 are indicated by the same reference numeral incremented by 200 and may not be described again.

Referring to FIG. 8, an internal combustion engine 210 comprises a combustion chamber 212 defined by walls 214, 216. The combustion chamber 212 houses a reciprocating piston 218 that is connected with a crankshaft (not shown) by a connecting rod (also not shown). The internal combustion engine 210 further comprises first valving 224 to admit an intake gas comprising an aspirant into the combustion chamber. The first valving 224 may be connected to an air supply system 226. The internal combustion engine 210 further comprises second valving 230 comprising at least one injector valve 236. Purely for ease of presentation, in the description that follows, references to the injector valve 236 will be in the singular. This is not to be taken as limiting as multiple injector valves 236 may be provided.

The injector valve 236 is connected with a reservoir via a fuel pump 254. The reservoir 252 is to hold a combustible fuel and the fuel pump 254 is operable to pump the fuel to the injector valve. The reservoir 252 and fuel pump 254 may a standard reservoir and fuel pump supplied with the internal combustion engine 210. The injector valve 236 is also connected with a second reservoir 256 via a pump 258. The pump 258 is operable to pump an aqueous fluid or a mixture comprising an aqueous fluid and a steam reforming fuel to the injector valve 236.

Referring to FIG. 9, the injector valve 236 comprises a valve body 270 configured to be inserted into an injector port 272 defined in the wall 214. The valve body 270 has a first, or outlet, end provided with a plurality of outlet apertures 274 and a second end provided with a flange 276. A keeper plate 278 may be secured to the wall 214 by screws, bolts or the like 280. The first injector valve 276 is configured to be engaged by the keeper plate 278 such that it is secured to the wall 214 by a pressing force applied by the keeper plate. A suitable seal 282 may be disposed between the flange 276 and wall 214 so as to be compressed and seal between them.

The injector valve 236 has an inlet head 284 extending from the side of the flange 276 opposite the side from which the valve body 270 extends. The inlet head 284 has connector parts 286, 288 for connection to respective pipes 290, 292 (FIG. 8) that connect the injector valve 236 with the pumps 254, 258.

The injector valve 236 carries a catalyst 254 for the steam reformation process that takes place in the combustion chamber 212 when operating a cycle incorporating a steam reformation process such as a modified diesel cycle the same as, or similar to, the modified diesel cycle described above with reference to FIGS. 5 and 6. The catalyst 254 may be provided in the form of a sleeve 290 secured to the outlet end of the valve body 270. The sleeve 290 may be a cylindrical member defining a fully enclosed flow path extending from the outlet end of the valve body 270. Alternatively, the sleeve 290 may, for example, be a partial sleeve provided with a side opening(s), which may, for example, be a lengthways extending slit(s). At the least some of the outlet apertures 274 may be configured to direct a spray of the output fluid directly onto the catalyst 254.

An injector valve carrying a catalyst, for example as illustrated in FIG. 9, may be provided in newly built engines. This provides the possibility configuring an engine to operate a cycle incorporating a steam reformation process, such as the modified diesel cycle described above with reference to FIGS. 5 and 6, without the need to reconfigure, or specially configure, the combustion chamber to receive a mounting for a catalyst. Such injector valves may also be used to provide a relatively straightforward means of adapting existing internal combustion engines to operate the modified diesel cycle. One or more injector valves carrying a catalyst may, for example, be supplied as a kit for retrofitting to an existing internal combustion engine in place of one or more standard injector valves. The kit may include a reservoir or a pump, such as the reservoir 256 and pump 258, with suitable piping to connect the injector valve(s) to the pump.

In the example by FIGS. 8 and 9, a catalyst is provided on an injector valve that is operated to admit an aqueous fluid, or a steam reforming fuel or a mixture comprising aqueous fluid and steam reforming fuel into the combustion chamber during the compression phase of a combustion cycle. This is not essential. The catalyst may be provided on an injector valve that is operable to admit the aspirant or the fuel admitted during the combustion phase of the cycle. In each case, the valve may be configured so that the catalyst it carries is exposed to the aqueous fluid, steam reforming fuel and heat in the combustion chamber so that it can function as a catalyst for the steam reformation process.

In the example illustrated above, the injector valve has respective connector parts for separate pipes by which the injector valve is connected to the reservoirs via the two pumps. In another example, a manifold or the like may be provided upstream of the injector valve to receive supplies from the reservoirs via their pumps so that the injector valve can have a single connector part by which the injector valve is connectable to the manifold or the like by a single pipe.

Figure 10:
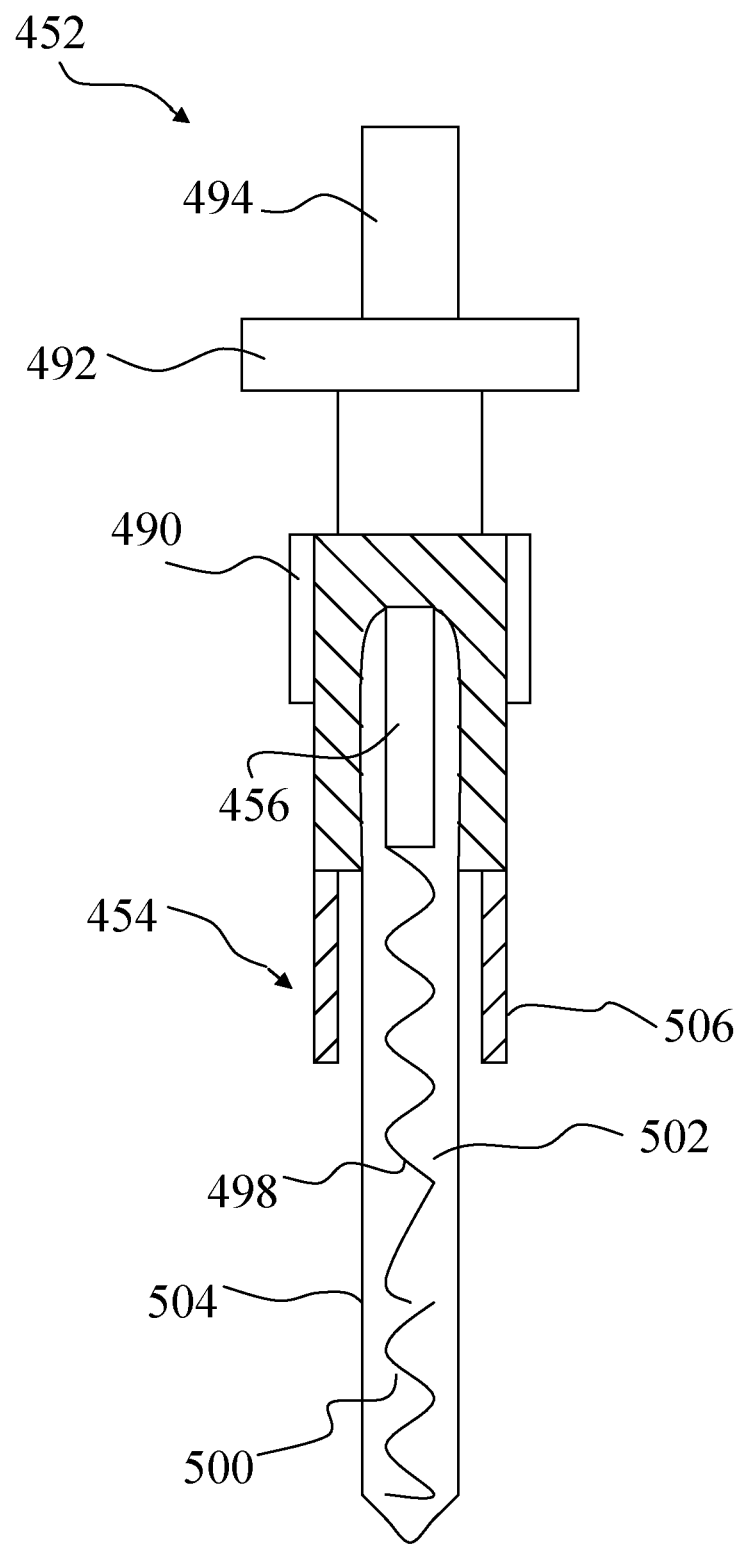
FIG. 10 is a schematic representation of a combustion initiator for the internal combustion engines of FIGS. 1 to 4, 7 and 8.

In other examples, internal combustion engine such as those illustrated by FIGS. 1 to 4, 7 and 8 and 9, may be provided with a combustion initiator carrying a catalyst. The combustion initiator may take the form of an electrical combustion initiator such as a glow plug, hot wire or spark plug. Referring to FIG. 10, an electrical combustion initiator in the form of a glow plug 452 may comprise a threaded body part 490 configured to permit the combustion initiator to be screwed into a suitably threaded port defined in a wall of a combustion chamber. The glow plug 452 may comprise a flange 492 configured to be engaged by a tightening tool, such as a wrench socket, to permit the combustion initiator to be firmly screwed into such a port. The glow plug 452 may comprise an electrical input terminal 494 configured to permit the glow plug to be electrically connected with a suitable electrical power source (not shown). Electrical power sources and connections between such sources and electrical combustion initiators in internal combustion engines will be familiar to those skilled in the art and will not described in herein. The glow plug 452 may further comprise a centre electrode 496 electrically connected with the input terminal 494 and heating and regulating coils 498, 500. The heating and regulating coils 498, 500 are encased in insulation powder 502 contained in a sheath or tube 504 disposed at the end of the glow plug 452 opposite the end at which the input terminal 494 is situated. The sheath 504 extends coaxially from an end of the body part 490. The sheath 504 functions as an energy output member and in use is disposed in the combustion chamber so that it is exposed to the fuel, hydrogen and air mixture in the combustion chamber and can add energy to the mixture in the form of heat. The glow plug 452 may at least assist in initiating combustion, at least during start up of the internal combustion engine 210 when the walls 214, 216 are relatively cold and may absorb a significant amount of the heat generated during compression of the intake gases.

The glow plug 452 further comprises a catalyst 454 for a steam reformation process that takes place in the combustion chamber when a steam reforming fuel and aqueous fluid are admitted to the chamber during compression of the intake gases. In the illustrated example, the catalyst 454 is a member 506 secured to the body part 490 of the glow plug. The member 506 may extend coaxially with the body part 490 and sheath 504 and is positioned such that when the glow plug 452 is installed, the catalyst is exposed to the aqueous fluid, heat and steam reforming fuel in the combustion chamber 212. The member 506 may be a sleeve surrounding the sheath 504 over a part of its length. Alternatively, the member 506 may, for example, be a partial sleeve provided with side openings to ensure the sheath 504 is not overly shielded from the fluids in the combustion chamber 212. In another example, the catalyst may be provided in the form of a plurality of members secured to the glow plug 452 or may be plated onto a part of the glow plug.

As with examples in which an injector valve comprises a catalyst, providing a combustion initiator with a catalyst provides a relatively straightforward means of adapting existing internal combustion engines to incorporate a steam reformation process into their operating cycle. Of course, a combustion initiator provided with a catalyst may be used in a new build engine that is designed to incorporate a steam reformation process in its operating cycle.

A combustion initiator(s) provided with a catalyst may be used in conjunction with an injector valve(s) provided with a catalyst, which may the same or a different catalyst, and supplied in a kit with reservoir and pump as previously described. Similarly, an injector valve(s) or combustion initiator(s) provided with a catalyst may be used in conjunction with catalysts mounted in the combustion chamber and may each be the same or different catalysts.

A kit for retrofitting to an existing internal combustion engine may additionally comprise control circuitry or instructions to modify the operation of the engine controller of the engine to configure it to operate a new cycle incorporating a steam reformation process. The control circuitry may take the form of, for example, an additional circuit board(s) to be plugged into the controller, a replacement circuit board(s) or a processor device loaded with the instructions. Alternatively, in other examples the kit may comprise a data carrier that can be temporarily connected with an engine controller to allow new instructions to be loaded onto the controller by way of a firmware upgrade or software update to memory.

In some examples, it may be desirable to provide discontinuities in the surface of the catalyst as a means of increasing the surface area of catalyst material exposed to the steam in the combustion chamber. The catalyst may for example be provided with surface grooves or ridges, or other discontinuities such as discrete projections or depressions that may have a circular, irregular or other shaped cross-section.

It will be understood that providing a catalyst for a steam reformation process on a combustion initiator or injector valve may be advantageous in that it allows the possibility of providing the catalyst by simply fixing replacement parts in existing ports provided in the combustion chamber walls.

Thus an existing internal combustion engine can be converted to incorporate a steam reformation process into its operating cycle with no changes made to the engine block or cylinder head. Alternatively, it may be advantageous to maximise the catalyst surface area by providing a catalyst in one or more recesses in the combustion chamber walls, on an injector valve(s) and on a combustion initiator(s).

In the illustrated examples, the steam and steam reforming fuel are admitted into the chamber via separate valves and mix in the injection zone in the chamber or are injected through a common injector so that a certain amount of mixing may take place upstream of the chamber. For certain examples, a mixing chamber may be provided upstream of the second valving so that the steam and steam reforming fuel can be supplied to the second valving as a mixture.

In the illustrated examples, a combination of an aqueous fluid and a steam reforming fuel is admitted into the combustion chamber during the compression stroke to promote a steam reforming process to separate hydrogen from the steam reforming fuel or steam to be combusted in the combustion chamber. In other examples, the aqueous fluid may be in the form of a water mist or a combination of water mist and vapour.

In the illustrated examples, the steam reforming fuel for the steam reforming process may be a non-aqueous hydrogen containing compound, hydrocarbon or fossil fuel. The same fuel may serve as the steam reforming fuel and the combustible fuel. Alternatively, the steam reforming and combustible fuels may be different. In general, the steam reforming fuel may be any fluid that can be injected into the chamber during the compression phase, or stroke, of the engine to react exothermically with oxygen; that is release energy when oxidised. In steam reforming the steam reforming fuel may be oxidised by the oxygen in the water (steam), thereby releasing hydrogen from the water (steam) or steam reforming fuel, it being understood that hydrogen may be released from both. In addition to the fuels previously mentioned, other fuels that may be used for the steam reforming fuel including hypergolic fuels, hydro peroxide and boranes such as diborane, pentaborane and decaborane.

It is to be understood that the steam reforming fuel is not necessarily combustible. However, if the steam reforming fuel is combustible, any residue from the steam reforming process can be burnt during the combustion process.

It is to be understood that while steam reforming is the predominant hydrogen separation process that takes place in the chamber, there may also be some hydrogen separated from the water (steam) by dissociation.

Due to the relatively high levels of water vapour present in the combustion chamber during the combustion process, the exhaust gases released from the combustion chamber will contain significant amounts of water vapour. In some examples, one or more condensers may be provided in the exhaust system to condense the water vapour for reuse as the aqueous fluid in subsequent engine cycles.

It will be understood that the best catalyst for a particular internal combustion engine and steam reforming fuel may be determined by testing. It is currently envisaged that Cu/ZnO, Pd/ZnO, $CuZrO_2$ or composite alloys of these will be suitable catalysts. The catalyst selected will need to have sufficient thermal durability to withstand use in a combustion environment.

In the illustrated examples, the body partially defining the variable volume chamber is a reciprocating piston. In other examples, the body may be a rotary member.

The description of the illustrated examples refers to the use of a pressure/temperature sensor(s) to provide the pressure/temperature indications that cause the controller to issue signals to cause the injection of the aqueous fluid and non-aqueous hydrogen containing compound during the compression stroke. In some examples, particularly in slower moving engines, a position sensor(s) detecting the position of the body in the combustion chamber, for example the piston 18, may be used. Thus, for example two position sensors spaced apart in the direction of movement of the piston may be used to provide an indication of the direction of movement of the piston, with the second sensor indicating that the piston has reached a position at which the volume of the chamber will be such that the pressure/temperature is the desired pressure/temperature at which injection should occur.

Although not limited to such applications, it is envisaged that internal combustion engines operating a modified diesel cycle as illustrated by FIGS. 5 and 6 will be suitable for applications in the automotive industry. While the structure and operating principles described above may be advantageously applied to newly built internal combustion engines, it is to be understood that existing engines may be modified by to obtain the benefits of the invention.

The invention claimed is:

1. A method of operating an internal combustion engine that comprises a variable volume combustion chamber containing a catalyst, said method comprising:
   at a first pressure in said combustion chamber, admitting an intake gas comprising an aspirant into said combustion chamber;
   reducing the volume of said combustion chamber to compress said intake gas to raise pressure in said combustion chamber from said first pressure to a second pressure that is greater than said first pressure;
   admitting an aqueous fluid and a steam reforming fuel into said combustion chamber when the pressure in said combustion chamber reaches a predetermined pressure intermediate said first and second pressures so that said aqueous fluid and steam reforming fuel absorb heat generated by said compression of said intake gas and said catalyst promotes a steam reformation process by which hydrogen is separated from said steam reforming fuel or said aqueous fluid;
   when the pressure in said combustion chamber is at least at said second pressure, admitting a combustible fuel into said chamber and combusting said combustible fuel and hydrogen; and
   wherein the volume of said combustion chamber is varied by moving a body in said combustion chamber and combustion of said fuel and hydrogen causes movement of said body to increase the volume of said combustion chamber and said movement of said body provides an energy output of said combustion chamber.

2. A method of operating an internal combustion engine as claimed in claim 1, comprising admitting said aqueous fluid and steam reforming fuel into said combustion chamber as a mixture.

3. A method of operating an internal combustion engine as claimed in claim 1, comprising controlling the admission of said aqueous fluid or said aqueous fluid and steam reforming fuel into said combustion chamber so that the temperature within said chamber remains substantially constant.

4. A method of operating an internal combustion engine as claimed in claim 1, comprising admitting said aqueous fluid into said combustion chamber as a water mist, vapour or a combination of water mist and vapour.

5. A method as claimed in claim 1, comprising releasing exhaust gases generated by combustion of said combustible fuel and hydrogen from said combustion chamber and extracting heat from said released exhaust gases to heat said aqueous fluid prior to admission of said aqueous fluid to said combustion chamber.

6. A method of operating an internal combustion engine as claimed in claim 1, comprising controlling the admission of said combustible fuel into said combustion chamber so that a substantially constant pressure is maintained during at least a first phase of combustion of said combustible fuel and hydrogen.

7. A method of operating an internal combustion engine as claimed in claim 1, wherein said body comprises:
   i) a reciprocating piston; or
   ii) a rotary member.

8. A method as claimed in claim 7, wherein said catalyst is carried by said reciprocating piston or rotary member.

9. A method as claimed in claim 1, wherein said catalyst is provided on a wall of said combustion chamber.

10. A method as claimed in claim 1, wherein said catalyst is provided on at least one of:
    i) an injector by which said steam reforming fuel or combustible fuel is admitted into said combustion chamber; and
    ii) a combustion initiator provided to initiate combustion of said combustible fuel and hydrogen.

11. A method as claimed in claim 1, wherein said steam reforming fuel and combustible fuel are the same.

12. An internal combustion engine comprising:
    a housing and a body movable in said housing to define a variable volume combustion chamber;
    a catalyst in said combustion chamber;
    first valving to admit an intake gas into said combustion chamber;
    an aqueous fluid supply system;
    second valving connected with said aqueous fluid supply system and operable to admit aqueous fluid from said aqueous fluid supply system and a steam reforming fuel into said combustion chamber;
    a controller configured to i) cause said first valving to admit a charge of intake gas into said combustion chamber and ii) when a predetermined condition exists in said combustion chamber during movement of said body to reduce the volume of said combustion chamber so as to compress said intake gas to raise pressure of said intake gas from a first pressure to a second pressure, cause said second valving to admit aqueous fluid from said aqueous fluid supply system and an amount of said steam reforming fuel into said combustion chamber so that said aqueous fluid and steam reforming fuel absorb heat generated by said compression of said intake gas and said catalyst promotes a steam reformation process by which hydrogen is separated from said steam reforming fuel or said aqueous fluid; and
    wherein said combustion of said fuel and hydrogen causes movement of said body and said movement of said body provides an energy output of said combustion chamber.

13. An internal combustion engine as claimed in claim 12, wherein said body comprises:
    i) a reciprocating piston; or
    ii) a rotary member.

14. An internal combustion engine comprising:
    a housing and a body movable in said housing to define a variable volume combustion chamber;
    at least one mounting to mount a catalyst in said combustion chamber;

first valving to admit an intake gas into said combustion chamber;

an aqueous fluid supply system;

second valving connected with said aqueous fluid supply system and operable to admit aqueous fluid from said aqueous fluid supply system and a steam reforming fuel into said combustion chamber;

a controller configured to cause said first valving to admit a charge of intake gas into said combustion chamber and ii) when a predetermined condition exists in said combustion chamber during movement of said body to reduce the volume of said combustion chamber so as to compress said intake gas to raise pressure of said intake gas from a first pressure to a second pressure, cause said second valving to admit aqueous fluid from said aqueous fluid supply system and an amount of said steam reforming fuel into said chamber so that said aqueous fluid and steam reforming fuel absorb heat generated by said compression of said intake gas in a presence of a catalyst mounted in said combustion chamber by said at least one mounting, with said catalyst promoting a steam reformation process by which hydrogen is separated from said steam reforming fuel or said aqueous fluid; and wherein said combustion of said fuel and hydrogen causes movement of said body and said movement of said body provides an energy output of said combustion chamber.

15. An internal combustion engine as claimed in claim 14, further comprising a first reservoir to contain said steam reforming fuel and wherein said second valving is connected with said first reservoir to admit said steam reforming fuel into said combustion chamber.

16. An internal combustion engine as claimed in claim 15, wherein said first reservoir, first valving and aqueous fluid supply system are configured so that said steam reforming fuel and said aqueous fluid are admitted to said combustion chamber as a mixture.

17. An internal combustion engine as claimed in claim 16, wherein said steam reforming fuel is a combustible fuel and said controller is configured to cause said second valving to admit a second amount of said steam reforming fuel into said combustion chamber when the pressure in said combustion chamber is at least said second pressure to be combusted with said hydrogen.

18. An internal combustion chamber as claimed in claim 16, further comprising a second reservoir to contain a combustible fuel that is different to said steam reforming fuel and wherein said second valving is connected with said second reservoir and said controller is configured to cause said second valving to admit said combustible fuel into said combustion chamber when the pressure in said combustion chamber is at least said second pressure to be combusted with said hydrogen.

19. An internal combustion engine as claimed in claim 18, wherein said second valving comprises a first valve to admit at least one of said aqueous fluid and steam reforming fuel into said chamber and a second valve to admit said combustible fuel into said chamber.

20. An internal combustion engine as claimed in claim 19, further comprising a sensor to provide signals indicative of the temperature in said combustion chamber and wherein said controller is configured to control the admission of said aqueous fluid or steam reforming fuel and aqueous fluid into the combustion chamber so as to maintain a substantially constant temperature in said combustion chamber.

21. An internal combustion engine as claimed in claim 20, wherein said sensor is an optical temperature sensor.

22. An internal combustion chamber as claimed in claim 21, further comprising an exhaust system to receive exhaust gases from said combustion chamber and cooperable with said aqueous fluid supply system to extract heat from exhaust gases flowing in said exhaust system to heat said aqueous fluid in said aqueous fluid supply system.

23. An internal combustion engine as claimed in claim 22, wherein said aqueous fluid supply and second valving are configured so that said aqueous fluid is admitted to said combustion chamber as a water mist, vapour or combination of water mist and vapour.

24. An internal combustion engine as claimed in claim 23, wherein said catalyst is provided on said second valving.

25. An internal combustion engine as claimed in claim 24, wherein said catalyst is provided on a combustion initiator that is operable to initiate combustion in said combustion chamber.

26. An internal combustion engine as claimed in claim 14, wherein said body comprises:
   i) a reciprocating piston; or
   ii) a rotary member.

* * * * *